June 2, 1936. G. F. CONNELLY 2,042,509
MACHINE FOR REMOVING TIRE TREADS
Filed Feb. 18, 1935 3 Sheets-Sheet 2
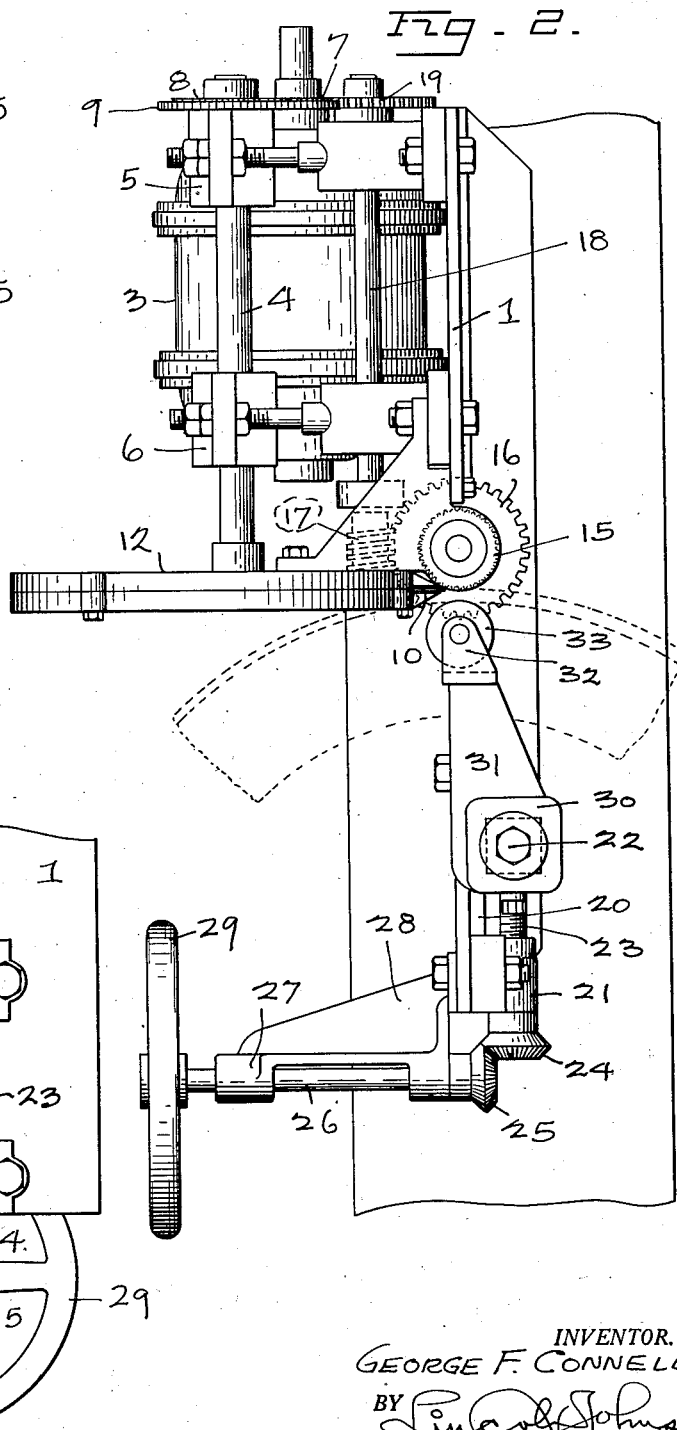
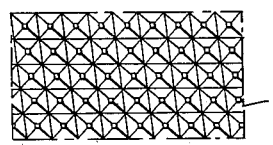
Fig. 5.
Fig. 6.
INVENTOR.
GEORGE F. CONNELLY
BY
ATTORNEY June 2, 1936. G. F. CONNELLY 2,042,509
MACHINE FOR REMOVING TIRE TREADS
Filed Feb. 18, 1935 3 Sheets-Sheet 3
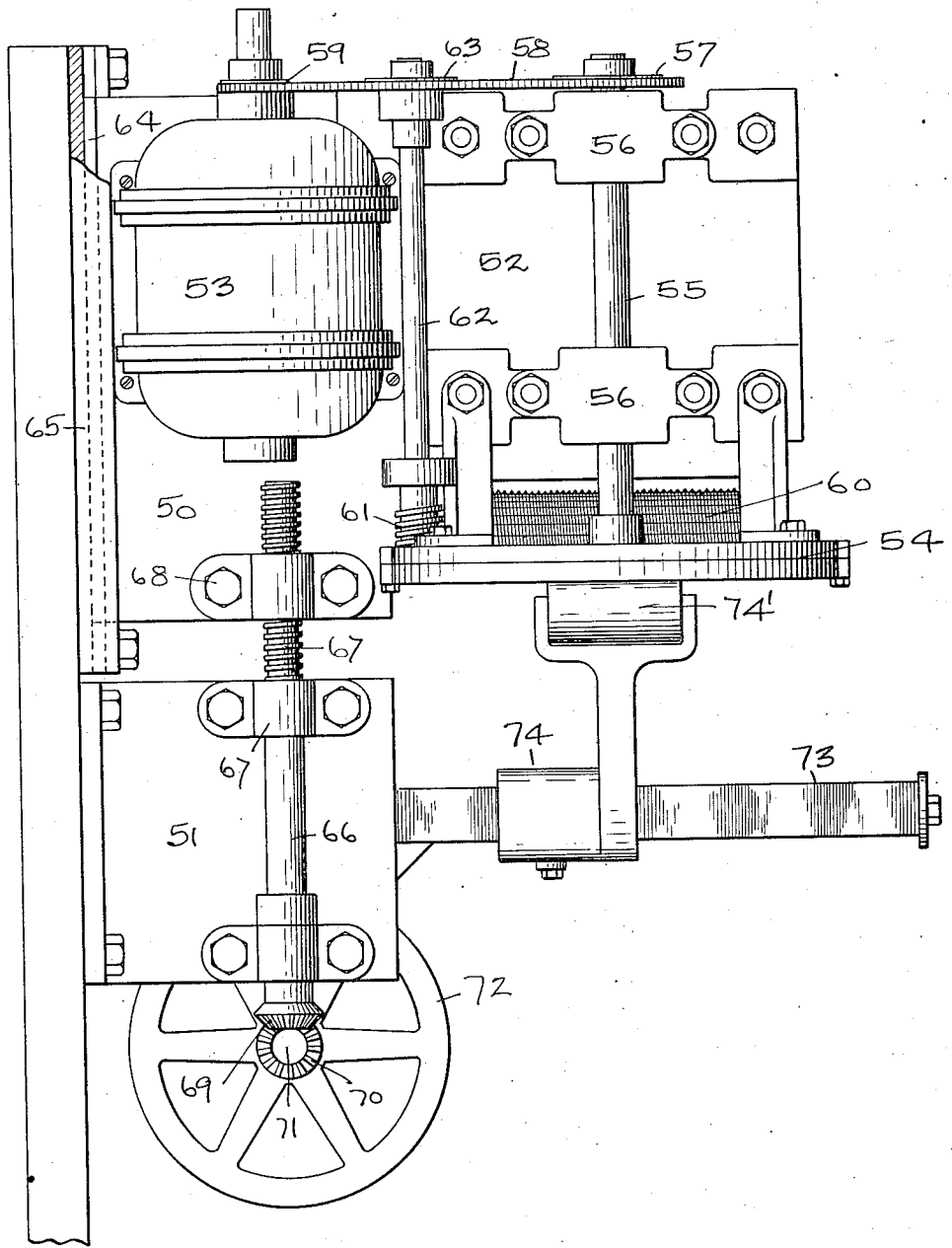
INVENTOR.
GEORGE F. CONNELLY
BY
ATTORNEY Patented June 2, 1936

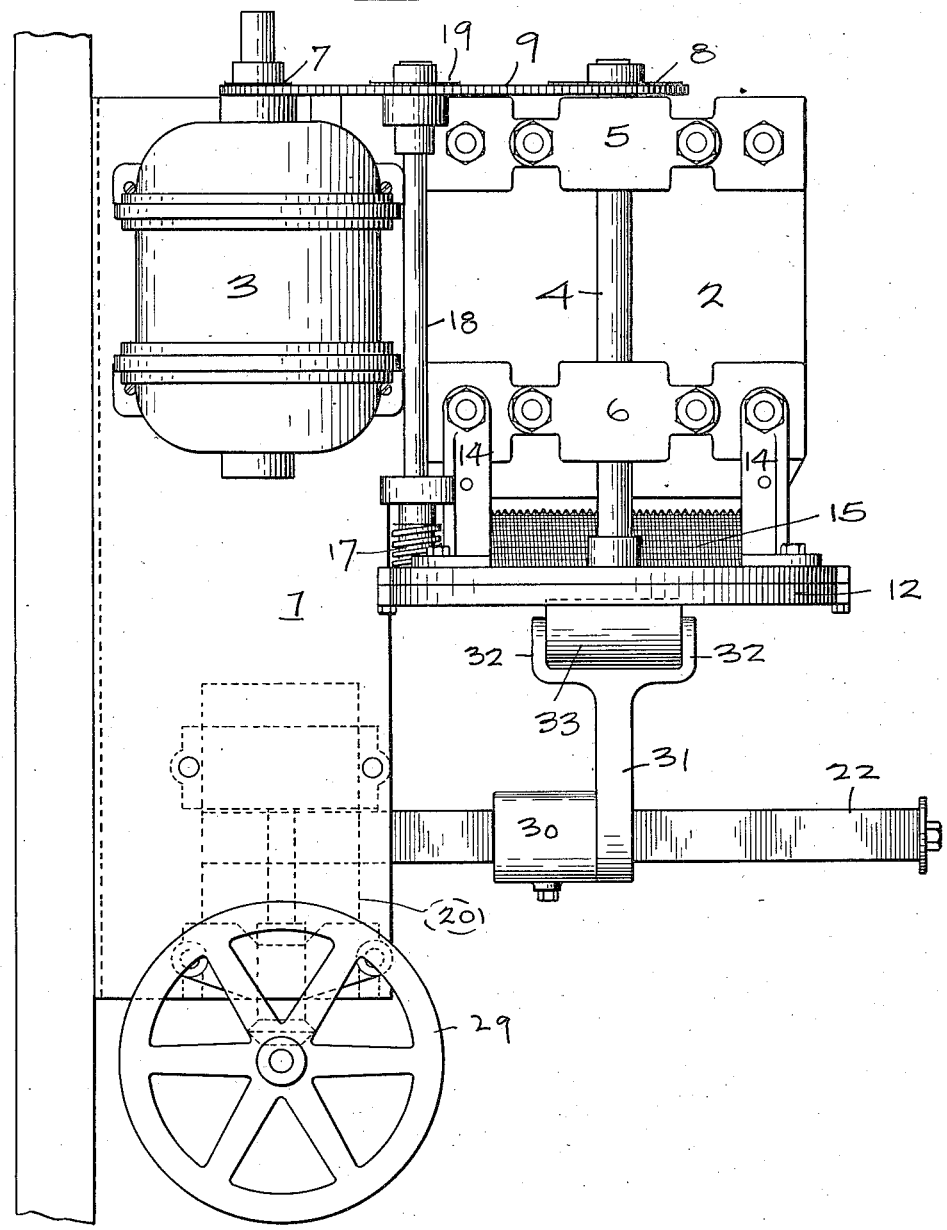

2,042,509

UNITED STATES PATENT OFFICE 2,042,509

MACHINE FOR REMOVING TIRE TREADS

George F. Connelly, San Francisco, Calif.

Application February 18, 1935, Serial No. 6,973

9 Claims. (Cl. 164—60)

This invention relates particularly to a machine for splitting or cutting the worn tread surface from a full circle pneumatic tire preliminarily to retreading said tire.

An object of the invention is to provide a machine for cutting the worn tread surface from a full circle tire carcass wherein by continuous operation, any selected thickness of the worn material may be cut from the exterior of said tire, means being provided to maintain the tread portion of the said tire in a flattened condition during the cutting operation.

A still further object of the invention is to provide a machine for cutting the worn tread from a full circle tire, wherein the cutting knife is adjustable relative to the surface of the worn tread of the tire to be removed therefrom, in order to regulate the depth of cut to be made on said tire, and wherein serrated rollers are provided adjacent the cutting knife, between which rollers the tire carcass is flattened, and by means of said rollers held in a constant position throughout the entire tread removing operation.

Other objects and advantages are to provide a machine for removing worn tire treads that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 1 represents a front elevation of a tire tread splitting machine constructed in accordance with my invention.

Fig. 2 is a side elevation of Fig. 1.

Fig. 3 is an enlarged cross section taken through the circular cutting knife.

Fig. 4 is a fragmentary front elevation of the slide adjustment for the lower tire supporting roller.

Fig. 5 is an enlarged elevation of a fragmentary portion of the ribbing on the uppermost roller.

Fig. 6 is a section through Fig. 5.

Fig. 7 is a front elevation of a modified form of tire tread splitting machine constructed in accordance with my invention.

The machine to be hereinafter described is designed to cut or split the worn tread from a full circle pneumatic tire carcass evenly and uniformly therearound, and by automatic continuous operation, whereby the cost of removing said worn tread surface as well as the period of time necessary to effect the removal of the same, is materially reduced below the cost and time involved where the tread removal is effected by hand.

In detail the construction illustrated in the drawings comprises a vertical or upright frame of the tread supporting machine, which frame is generally designated by the numeral 1, and which includes the foundation structure on which all of the operating parts of the machine are mounted. The frame 1 in its present embodiment consists of a metal plate, one side of which is provided with a head portion 2 projected outwardly from the upper end of the frame 1, the projecting portion 2 being substantially one-half the length of the frame 1. A motor 3 is bolted or otherwise fixedly secured to one side of the frame 1, and the axis of said motor is located in the vertical plane. A shaft 4 is disposed vertically on the head 2, with the axis thereof parallel to the axis of the motor 3, said shaft 4 being supported at opposite ends thereof by bearings 5 and 6, and said bearings are secured to the same side of the projecting head 2 as that on which the motor 3 is located. The upper end of the shaft of the motor is provided with a sprocket 7 thereon and a sprocket 8 is provided on the upper end of the shaft 4. A continuous endless chain or belt 9 passes around the sprockets 7 and 8 on the motor 3 and shaft 4.

A circular cutting knife 10 is secured by means of a central hub or flange 11 to the lower end of the shaft 4. The cutting knife 10 is confined within a casing which constitutes a sheath or guard 12, and one edge of said casing has its top and bottom sides beveled as at 13, at a point rearwardly of the cutting edge of the blade, to form a substantial continuation with the bevel of the opposite cutting edges of said knife. The casing 12 encloses the cutting knife 10 substantially throughout the entire area thereof, with the exception of one side thereof where the casing is slotted to permit the said cutting knife to project therethrough a slight distance beyond the tapered side walls of said casing. The casing 12 is secured to the face of the projecting head 2 by means of the brackets 14—14. The cutting blade and the casing in which it is mounted, remain at the same elevation at all times.

A roller 15 has its opposite ends journaled on a horizontal plane in the spaced brackets 14—14. A worm gear 16 is secured on one end of the roller, and said worm gear meshes with a worm 17 mounted on a vertically disposed shaft 18 arranged intermediate the motor 3 and shaft 4. The upper end of the shaft 18 is provided with a sprocket 19 thereon, and said sprocket is arranged in meshing engagement with the drive chain or belt 9. Both of the shafts 4 and 18 are driven in unison by the motor, and at selected ratios of speed, according to the diameter of the sprockets used. The roller 15 turns at a much slower speed than the cutting knife, because of the reduction gearing interposed between the said roller 15 and the drive chain 9. The circumference of the roller 15 is milled or machined, both horizontally and transversely, to provide a plurality of individual pyramidal shaped teeth throughout the entire area thereof, and to thus form an effective frictional surface for moving the tire from which the worn tread surface is to be removed toward the uncovered edge of the cutting blade 10.

A slide member 20 is provided on the lower end of the frame 1 on the face thereof opposite to that on which the motor is mounted, said slide being confined in spaced guides 21—21, and being movable in a vertical direction on the rear face of the said frame. A vertically disposed threaded shaft 23 is rotatably mounted in bearings provided in the spaced guides 21—21. A bar 22 has one end thereof secured to the face of the slide 20, and said bar 22 is threaded to receive the threaded shaft 23, whereby when the shaft 23 is rotated, both the bar 22 and slide 20 will be moved vertically relative to the guides 21—21. A bevel pinion 24 is fixed to the lower end of the shaft 23, and said pinion meshes with a pinion bevel gear 25 fixed on the end of the shaft 26 rotatably mounted in bearings 27 on a bracket 28. The other end of the shaft 26 is provided with a hand wheel 29 thereon on the front side of the frame 1, and by means of said hand wheel, the threaded shaft may be turned for raising and lowering the bar 22, for the purpose to be hereinafter described.

The bar 22 extends laterally outward in a horizontal plane beneath the roller 15, and in substantially vertical alignment with said roller. The bar 22 is preferably made square or some desirable polygonal section. A collar 30 is slidably mounted on the bar 22, and said collar is provided with a bracket 31 extended upwardly therefrom. The upper end of the bracket 31 is flared to provide a bearing 32—32 within which a roller 33 is rotatably mounted. The axis of the roller 33 is parallel to the axis of the roller 15, and both the rollers 15 and 33 are in alignment in the vertical plane. While I have shown the part 33 as a roller, it is to be understood that some other desirable form of tire supporting element might be substituted in lieu thereof.

The device operates as follows. The tire carcass from which the worn tread surface is to be removed, is hung or supported pendant fashion on the roller 33, after the said roller has been moved from operating relationship relative to the roller 15, said latter movement being accomplished by moving the slide with the bar 22 thereon and sliding the collar 30, which supports the roller 33 away from beneath the upper roller 15. The length of the lower roller 33 is such that it will fit the interior of a full circle pneumatic casing and will deform the normal circular cross section of said casing, and provide a substantial flattened portion across the upper portion thereof, when the said tread surface of the tire is squeezed between the upper roller 15 and lower roller 33. After the tire has been placed on the lower roller 33, said roller would be slid inwardly on its core on the bar 22 to a point opposite the central portion of the roller 15, after which the bar and roller carriage, together with the tire thereon, would be elevated into a position of contact with the upper roller 15, and the tread portion of the tire is squeezed between the rollers 15 and 33 until the portion of the tire between the rollers is compacted to a degree that it cannot yield, and substantially the entire tread surface of the tire is flat. The exposed cutting edge of the circular knife 10 is located at a point directly in front of the aligned axes of the rollers 15 and 33, and when the tire is squeezed between the rollers, the tread portion thereof is in readiness to be cut from the tire carcass. The amount or thickness of cut to be made from the tread portion of the tire may be regulated by the degree of pressure or squeeze, which is applied to the said tire by the rollers 15 and 33. Once the tire has been placed in compressed position between the rollers, the cutting knife will sever the same amount of rubber from around the entire circumference thereof. The cutting knife 10 rotates at practically motor speed, and the tire carcass is fed or advanced toward the cutting knife by the uppermost roller 15, which in turn, is driven at a speed reduced considerably below that of the motor. Additional tread surface may be removed from the tire by regulating the degree of compression under which the tire is placed, and avoiding the necessity of having to remove the tire carcass from the machine during each cutting operation. After the desired amount of tread surface has been removed from the tire, the bottom roller 33 would be lowered in the manner heretofore described, the tire removed from said roller, a fresh tire placed on said roller, and the cutting operation repeated.

In the modified form of the invention shown in Fig. 7, I have provided a frame 50, which has an extended head portion 52 thereon. A motor 53 is bolted onto the frame 50. A casing 54 is disposed in a horizontal plane on the head 52 and a circular cutting knife (not shown) is enclosed within the casing 54. A shaft 55 is journaled in bearings 56—56 on the head 52, the lower end of said shaft being drivingly connected to the cutting knife, and the upper end of said shaft having a sprocket 57 thereon which is drivingly connected to a chain 58 and to a sprocket 59 on the motor shaft. A ribbed roller 60 is journaled in a horizontal plane on the extended head 52 in mediate proximity to the exposed cutting edge of the circular knife in the same manner as heretofore indicated in the preferred form of the invention. The roller 60 is driven by a worm 61 fixed on a shaft 62, and the upper end of said shaft is provided with a sprocket 63 thereon which is driven by the chain 58. All of the parts, such as the motor 53, knife guard 54, shaft 55, and roller 60 are mounted permanently on the frame 50. The head 52 and the relative location of said parts, remain the same at all times.

The frame 50 is provided with a slide member 64 on one side thereof, said slide being confined in a guide 65, whereby the said slide may be moved vertically in the guide. A fixed frame 51 is fixedly mounted immediately below the frame 50 and in vertical alignment therewith. A shaft 66 is rotatably supported in journals 67 on said fixed frame 51, and the upper end of said shaft is threaded as at 67, and is engaged with a threaded socket 68 on the lower end of the frame 50. The shaft 66 is provided with a bevel gear 69 thereon which meshes with a pinion bevel gear 70 mounted on a shaft 71, the shaft 71 having a hand wheel 72 thereon, by means of which the shaft 66 is rotated, thereby causing the threaded end thereof to raise or lower the frame 50 with all of its mechanism thereon, relative to the fixed frame 51. The frame 51 is provided with a fixed bar 73 thereon, on which a carriage 74 is slidably mounted, the upper end of said carriage being forked to provide bearings within which a roller 74' is rotatably mounted.

In the preferred form of the invention it will be noted that the lower roller 33, which carries the tire tread cutting apparatus, together with the bar 22 on which the same is mounted, may be raised and lowered into and from contacting relationship with the upper roller 15.

In the modified form of the invention, the lower roller 74' which carries the tire tread cutting apparatus, remains in a fixed position at all times, and the upper roller with the circular cutting knife thereon may be raised and lowered into contacting relationship therewith. In either the preferred or modified form of the invention, the mode of operation of cutting the tread from the tire is precisely the same, and in each form of the invention the compression rollers are moved toward or from each other.

Having thus described this invention, what I claim and desire to secure by Letters Patent is:

1. An apparatus to cut the curved tread from a full circle tire consisting of a frame, a motor on said frame; a shaft on said frame; means drivingly connecting said motor and shaft; a circular cutting knife mounted on an end of said shaft; a roller journaled in said frame parallel to the plane of said cutting knife on one side thereof and substantially tangential to a portion of the cutting edge of said knife; means drivingly connecting said roller to said motor; means to be inserted within a tire and to support said tire in hanging position thereon, said last mentioned means being disposed in complementary relation to the driving roller; a carriage having said last mentioned means mounted thereon; and a bar having said carriage mounted thereon, said bar being movable toward and from the driven roller whereby the tire carrying means may be advanced toward the driven roller to squeeze the tire into a flattened position therebetween.

2. An apparatus to cut the tread from a full circle tire casing, comprising a flattened support insertable within the said casing; a driven roller engageable with the outer tread surface of said casing; means to move said support with the casing thereon into contact with the last mentioned roller whereby said casing will be flattened between the support and roller and be advanced circumferentially therebetween; and a driven circular cutting knife engageable with substantially the entire area of the outer tread surface of the casing as said casing is fed toward the knife by said roller to cut said tread surface from the casing in a single continuous operation.

3. An apparatus to cut the tread from a full circle tire casing, comprising a frame; a slide adjustably mounted on said frame; a bar projecting out from the side of said slide; a carriage slidably mounted on said bar; a roller on said carriage insertable within the tire casing to support said casing in a hanging position thereon; a driven roller on said frame; means to move said slide, bar, and carriage to elevate the tread surface of the casing into contact with said last mentioned roller and to flatten said casing therebetween; means to drive said last mentioned roller to move the tire casing circumferentially; and a driven circular cutting knife engageable with the outer tread surface of the casing as said casing is fed between the rollers.

4. An apparatus to cut the tread from a full circle pneumatic tire casing, including a pair of rollers engaging respectively the inside and outside of the tread of the tire to flatten the same, the outside roller being driven to continuously rotate the tire; and a circular cutting knife adjacent the rollers to cut the tread from the flattened portion of the tire in a single continuous operation as the tire is advanced toward the knife by the rollers, said inside roller being adjustable toward and from the outside roller in a plane parallel thereto and slidable on a plane axially relative thereto.

5. An apparatus to cut the tread from a full circle pneumatic tire casing, including a pair of rollers engaging respectively the inside and outside of the tread of the tire to flatten the same, the outside roller being driven to continuously rotate the tire; a circular cutting knife adjacent the rollers to cut the tread from the flattened portion of the tire as the tire is advanced toward the knife by the rollers, said inside roller being adjustable toward and from the outside roller in a plane parallel thereto and slidable on a plane axially relative thereto; a motor; means drivingly connecting said motor to said cutting knife; and means drivingly connecting said last mentioned driving means to said driven roller.

6. An apparatus to cut the tread from a full circle tire casing, comprising a frame; a slide adjustably mounted on said frame; a bar projecting out from the side of said slide; a carriage slidably mounted on said bar; a roller on said carriage insertable within the tire casing to support said casing in a hanging position thereon; a driven roller on said frame; means to move said slide, bar, and carriage to elevate the tread surface of the casing into contact with said last mentioned roller and to flatten said casing therebetween; means to drive said last mentioned roller to move the tire casing circumferentially; a driven circular cutting knife engageable with the outer tread surface of the casing as said casing is fed between the rollers; a motor on said frame; a chain drive connecting said motor and cutting knife; and a speed reduction mechanism drivingly connecting said drive chain and driven roller.

7. An apparatus to cut the tread from a full circle tire casing, comprising a flattened support insertable within the said casing; a driven roller engageable with the outer tread surface of said casing; means to move said roller into contact with said support with the casing thereon whereby said casing will be flattened between the support and roller and be advanced circumferentially therebetween; and a driven circular cutting knife engageable with the outer tread surface of the casing as said casing is fed toward the knife by said roller.

8. An apparatus to cut the tread from a full circle pneumatic tire casing, including a pair of rollers engaging respectively the inside and outside of the tread of the tire to flatten the same, the outside roller being driven to continuously rotate the tire; and a circular cutting knife adjacent the rollers to cut the tread from the flattened portion of the tire in a single continuous operation as the tire is advanced toward the knife by the rollers, one of said rollers being adjustable toward or from the other roller in a plane parallel thereto.

9. An apparatus to cut the tread from a full circle pneumatic tire casing, including a pair of rollers engaging respectively the inside and outside of the tread of the tire to flatten the same, the outside roller being driven to continuously rotate the tire; a circular cutting knife adjacent the rollers to cut the tread from the flattened portion of the tire as the tire is advanced toward the knife by the rollers, said outside roller being adjustable toward and from the inside roller in a plane parallel thereto and slidable on a plane axially relative thereto; a motor; means drivingly connecting said motor to said cutting knife; and means drivingly connecting said last mentioned driving means to said driven roller.

GEORGE F. CONNELLY.